Jan. 10, 1956   K. SINGER   2,730,675
SMALL AMPLITUDE MEASURING SYSTEM
Filed May 15, 1951
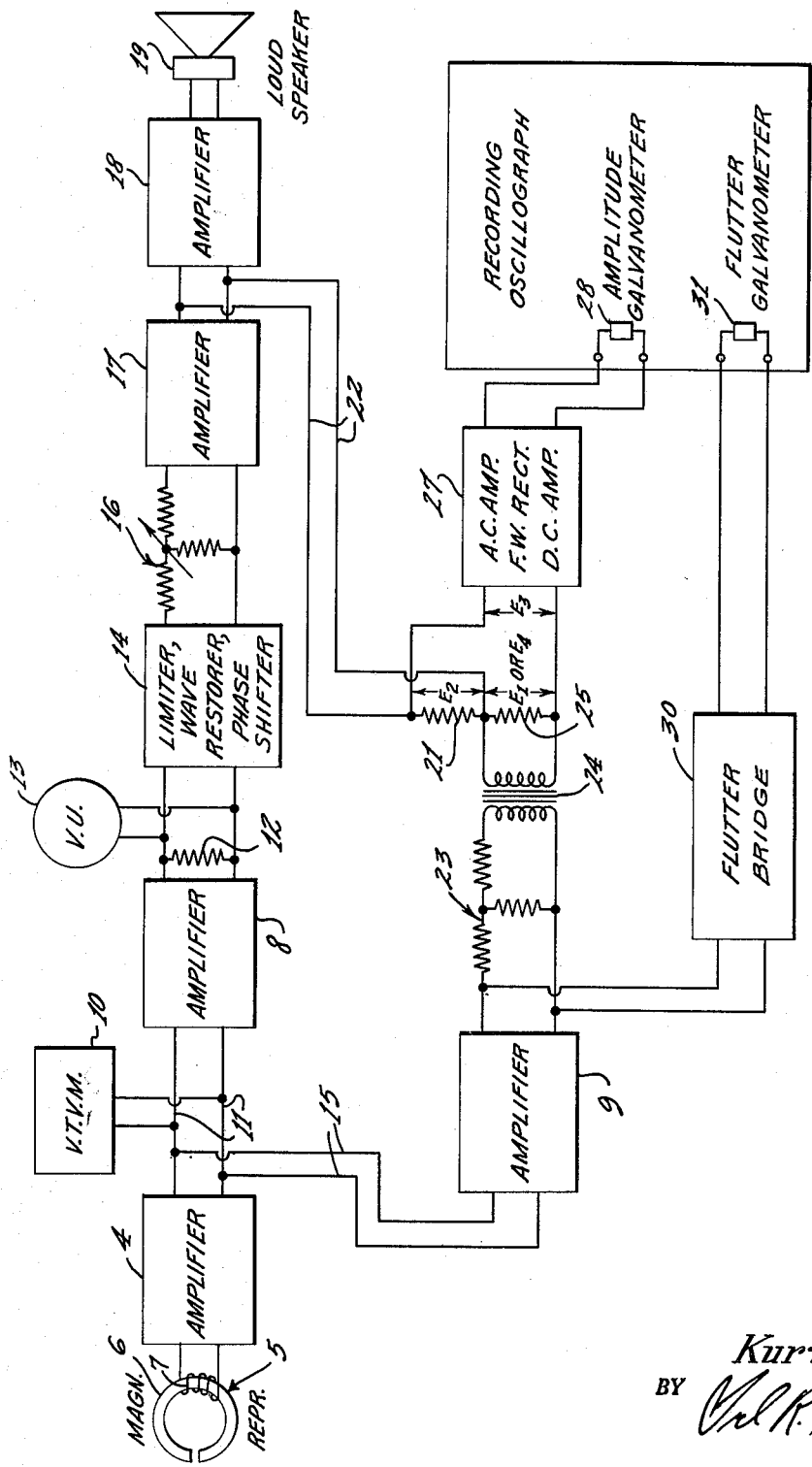
INVENTOR.
Kurt Singer
BY
ATTORNEY.

United States Patent Office 2,730,675
Patented Jan. 10, 1956

2,730,675

SMALL AMPLITUDE MEASURING SYSTEM

Kurt Singer, North Hollywood, Calif., assignor to Radio Corporation of America, a corporation of Delaware Application May 15, 1951, Serial No. 226,515

The terminal 15 years of the term of the patent to be granted has been disclaimed 2 Claims. (Cl. 324—78)

This invention relates to measuring and testing systems, and particularly to a system for measuring small amplitude changes of an alternating current or voltage without amplifying the steady state signal.

It is frequently desirable to observe the constancy of output from an amplifier, sound record, or other electrical signal producing source. Visual indications can be obtained by means of oscilloscopes provided the amplitude variations are reasonably large. However, to investigate output variations of less than one decibel, it becomes difficult to observe or record such variations because they constitute less than ten percent of the total output amplitude. The present invention permits the amplification of the output variations to almost any desired degree without amplifying the steady state signal itself. High amplification of the steady state signal is impractical because of the limited output capabilities of amplifiers and limited deflection capabilities of recording devices, such as galvanometers. The present invention, therefore, permits the study of amplitude modulations in transmission and sound recording systems, especially from a recording medium, and also, the effect of amplitude modulations on flutter or frequency modulation in sound recording systems.

The principal object of the invention, therefore, is to facilitate the measurement of small amplitude changes.

Another object of the invention is to provide an improved system for indicating, observing, and recording small amplitude variations in a signal.

A further object of the invention is to provide an improved system for obtaining large visual indications of small output variations from transmission systems or of recorded signals.

Although the novel features which are believed to be characteristic of this invention will be pointed out with particularity in the appended claims, the manner of its organization and the mode of its operation will be better understood by referring to the following description, read in conjunction with the accompanying drawing, forming a part hereof, in which the single figure is a block diagram of a system embodying the invention.

Referring now to the drawing, a source of signal is indicated as a magnetic reproducer head 5 having a core 6 and a winding 7. It is to be understood that the signal source may be other types of pickup devices or the output of various types of signal transmission units. The output of the head 5 is amplified by an amplifier 4, which is fed simultaneously to an amplifier 8 and an amplifier 9 over conductors 11 and 15, respectively. The output of amplifier 4 may be measured on a vacuum tube volt meter 10.

The output of amplifier 8 is fed over a terminating resistor 12 to a volume indicator unit 13 and to three units indicated at 14. These units are an amplitude limiter, a wave restorer, and a phase shifter, the purpose of which will be explained hereinafter. It is to be noted that the wave restorer should consist of a low pass or band pass filter in order to retain sufficient band width so as to faithfully reproduce the frequency modulated signal. The next unit is a volume control pad 16, the output of which is fed to an amplifier 17. The output of amplifier 17 is fed through an amplifier 18 to a loudspeaker 19 for audible observation. The output of amplifier 17 is also fed to a resistor 21 over conductors 22.

The other output branch from the amplifier 4, amplified in amplifier 9, is fed to a fixed attenuating pad 23, then to an isolating transformer 24, and then to a resistor 25. The resistors 21 and 25 are connected together, while their outer terminals are connected to an alternating current amplifier, followed by a full-wave rectifier, which, in turn, is followed by a direct current amplifier, shown as unit 27. The output of the unit 27 is fed to a recording oscillograph modulator 28.

A portion of the output of amplifier 9 is also impressed on a flutter bridge 30 connected to a modulator 31 of the recording oscillograph. The actuation of modulators 28 and 31 is simultaneously recorded.

In the operation of the above system, the limiter of unit 14 reduces all signal amplitude variations to the same level, the result being substantially square-top waves of constant amplitude. The wave restorer then restores the original shape of the wave, the amplitude of which will be constant. This wave is then impressed upon the resistor 21 across which a voltage $E_2$ will be obtained. The original signal wave, amplified by amplifier 9, will be impressed upon resistor 25 with its original amplitude variations. The phase shifter of unit 14 is now adjusted so that the reference wave at 21 is exactly 180 degrees out-of-phase with the signal wave applied across resistor 25. Furthermore, the amplitude control unit 16 is adjusted so that the peak amplitudes of the reference wave at 21 will equal the steady state peak amplitudes of the original wave across resistor 25, which produces a voltage $E_1$. The resulting signal from the resistors 21—25 will be impressed on the alternating current amplifier in unit 27 as $E_3$.

That is, the voltage developed across resistor 21 is free from amplitude variations, since part of the output of amplifier 4 has to pass through the limiter in which all amplitude variations have been removed. The voltage developed across resistor 25 still contains the original amplitude variations contained in the output of the amplifier 4. However, the voltages $E_1$ nd $E_2$ developed across resistors 25 and 21, respectively, are poled in such a manner that they are 180 degrees out-of-phase, and, consequently, cancel each other, provided that they are of equal amplitude. In order to obtain accurate amplitude adjustments of these two voltages, the gain control 16 is provided. To permit a precise 180-degree out-of-phase adjustment, the phase shifting network is used. It can readily be seen that, if voltages $E_1$ and $E_2$ are alike and 180 degrees out-of-phase, the voltage $E_3$ will be zero, provided a perfect adjustment between $E_1$ and $E_2$ has been obtained.

If there are amplitude variations in the output of amplifier 4, then the voltage $E_2$ will still be constant, whereas the voltage $E_1$ will vary. Consequently, a voltage $E_3$, equal to the difference in voltage between $E_1$ and $E_2$, will be obtained. This voltage $E_3$ is amplified by means of the alternating current amplifier in unit 27, rectified by the full-wave rectifier in unit 27, and the output of the rectifier amplified by the direct current amplifier in unit 27. The output of the direct current amplifier is then fed to galvanometer 28 of the recording oscillograph and recorded directly above the flutter recording by galvanometer 31. No time constant exists in the full-wave rectifier and the frequency characteristic of the amplitude variation recordings is only limited by the frequency characteristic of the amplitude recording galvanometer.

The fact that voltage $E_3$ expresses amplitude variations of the output of amplifier 4 in amplified form can be expressed very simply mathematically as follows:

$$E_3 = E_1 - E_2 \text{ or } E_2 - E_1$$

Now, if we assume that $E_2$ equals $.99E_1$, then $E_3$ equals $.01E_1$. This condition corresponds to an initial balance of one percent which can be readily obtained in practice. If we assume that the voltage $E_1$ changes by about one decibel, so that it becomes $.9E_1$, then the new voltage $E_1$ or $E_4$ equals $.9E_1$. For this condition, $E_3$ equals $.99E_1$ minus $.9E_1$. Therefore, $E_3$ equals $.09E_1$, and, since $20 \log .09E_1/.01E_1$ equals 19 decibels, an initial amplitude change of one decibel can be amplified to an amplitude change of 19 decibels with the above described method and system. This permits any desired study of amplitude changes to be readily made by observation or by recording, and particularly the effect of amplitude variations on flutter or frequency modulation when simultaneous recordings thereof are made simultaneously with the output of a flutter bridge.

I claim:

1. An electric measuring system comprising a signal wave source adapted to vary in frequency and amplitude, means connected to said signal wave source for limiting the amplitude of said signal wave to a constant amplitude, means connected to said limiting means for restoring the wave shape of said signal wave at said constant amplitude, means connected to said wave shape restoring means for shifting the phase of said wave 180 degrees, a second circuit means connected to said original signal wave source for obtaining said original signal with its original amplitude variations, combining means connected to said phase shifting means and to said last mentioned means for algebraically adding said restored wave of constant amplitude and 180 degrees phase shift to the original signal wave of varying amplitude, and means connected to said combining means for indicating the differential wave between said restored wave of constant amplitude and said original signal wave of varying amplitude, said differential indicating means being a recorder, said recorder including means to compare the amplitude of said differential wave with variations in frequency of said signal wave.

2. An electric measuring system in accordance with claim 1, in which said last mentioned means includes a flutter bridge for detecting the frequency variations of said original signal wave.

References Cited in the file of this patent

UNITED STATES PATENTS

| | | |
|---|---|---|
| 2,128,801 | Cooley | Aug. 30, 1938 |
| 2,226,459 | Bingley | Dec. 24, 1940 |
| 2,415,456 | Brumbaugh | Feb. 11, 1947 |
| 2,444,676 | Roberts et al. | July 6, 1948 |
| 2,534,957 | Delvaux | Dec. 19, 1950 |